US 8,016,476 B2

(12) United States Patent  
Chen et al.

(10) Patent No.: US 8,016,476 B2
(45) Date of Patent: Sep. 13, 2011

(54) BACK LIGHT MODULE (75) Inventors: Ming-Da Chen, Taichung County (TW); Chin-Liang Chen, Taichung (TW); Yu-Ching Wang, Taichung County (TW)

(73) Assignee: Wintek Coropration, Taichung (TW)

( * ) Notice: Subject to any disclaimer, the term of this patent is extended or adjusted under 35 U.S.C. 154(b) by 342 days.

(21) Appl. No.: 12/465,951

(22) Filed: May 14, 2009

(65) Prior Publication Data
US 2009/0284987 A1 Nov. 19, 2009

(30) Foreign Application Priority Data

May 15, 2008 (TW) .............................. 97117791 A (51) Int. Cl.
*F21V 23/00* (2006.01)
(52) U.S. Cl. ...... 362/631; 362/632; 362/97.1; 362/97.3; 349/58; 349/61
(58) Field of Classification Search ........ 362/97.1–97.3, 362/632–634; 349/58, 61–79
See application file for complete search history.

(56) References Cited

U.S. PATENT DOCUMENTS

| 7,513,661 | B2 * | 4/2009 | Hamada et al. | 362/373 |
| 7,641,376 | B2 * | 1/2010 | Sakai et al. | 362/623 |
| 7,819,574 | B2 * | 10/2010 | Yoo et al. | 362/633 |
| 7,866,874 | B2 * | 1/2011 | Liu et al. | 362/634 |

* cited by examiner

*Primary Examiner* — Anabel Ton
(74) *Attorney, Agent, or Firm* — Thomas|Kayden (57) ABSTRACT A backlight module including a frame, a light guide plate, a light source and a flexible printed circuit board is provided. The flexible printed circuit board includes a body, a light source carrying portion and a connecting portion. The body is bent, so a top edge and a bottom edge of the body are respectively disposed at a top side and a bottom side of the frame. The light source carrying portion carries the light source. The connecting portion has a first end and a second end. The first end is connected to a middle region of a bottom side of the light source carrying portion. The second end is connected to the bottom edge. The connecting portion is bent, such that the light source carrying portion is disposed on the top side of the frame and the light source is positioned at a side of the light guide plate.

13 Claims, 7 Drawing Sheets

FIG. 7

BACK LIGHT MODULE

This application claims the benefit of Taiwan application Serial No. 97117791, filed May 15, 2008, the subject matter of which is incorporated herein by reference.

BACKGROUND OF THE INVENTION

1. Field of the Invention

The invention relates in general to a backlight module, and more particularly to a backlight module with a flexible printed circuit board which is bent to be disposed on a frame.

2. Description of the Related Art

Figure 1A:
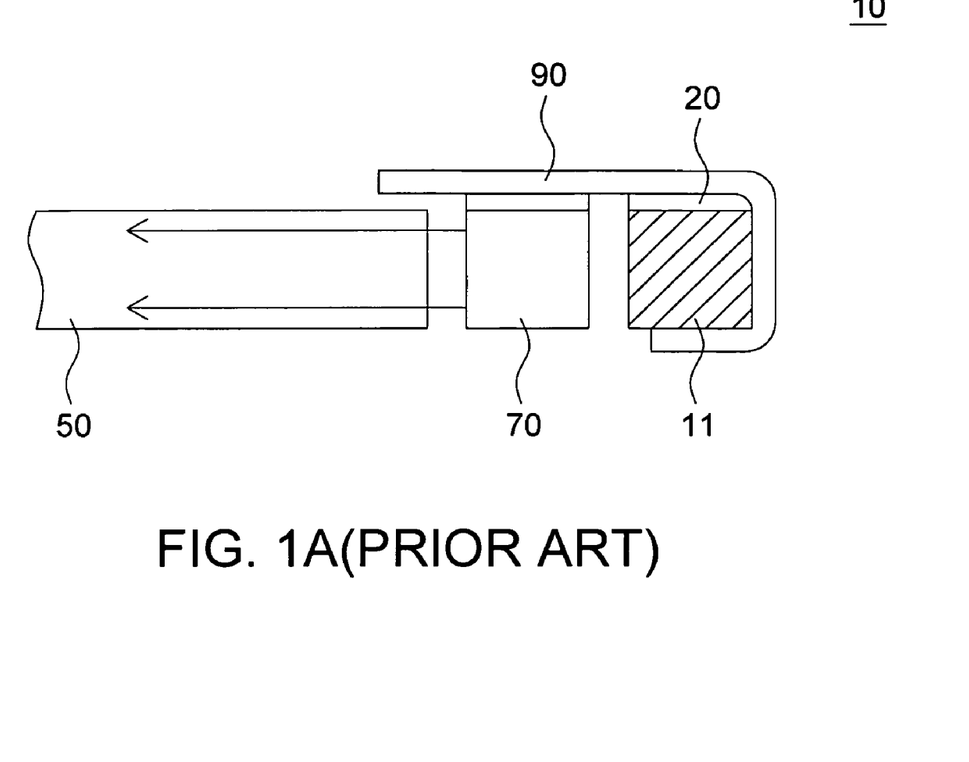
FIG. 1A (Prior Art) shows a sectional view of a flexible printed circuit board disposed at a frame.

Along with the progress in display technology, a backlight module is used in a liquid crystal display device to be a light source. The small-sized backlight module includes a light emitting diode (LED), a flexible printed circuit board, a frame and a light guide plate. The light guide plate is disposed in the frame. Referring to FIG. 1A, a sectional view of a flexible printed circuit board disposed at a frame is shown. The flexible printed circuit board 90 is bent to be disposed on two opposite sides of the frame 11, and glue 20 is smeared between the flexible printed circuit board 90 and the frame 11 to adhere the flexible printed circuit board 90 on the frame 11. The LED 70 is positioned at a side of the light guide plate 50. When the LED 70 emits light, the light will radiate into the light guide plate 50. The structure of the light guide plate 50 changes the direction of the light.

Figure 1B:
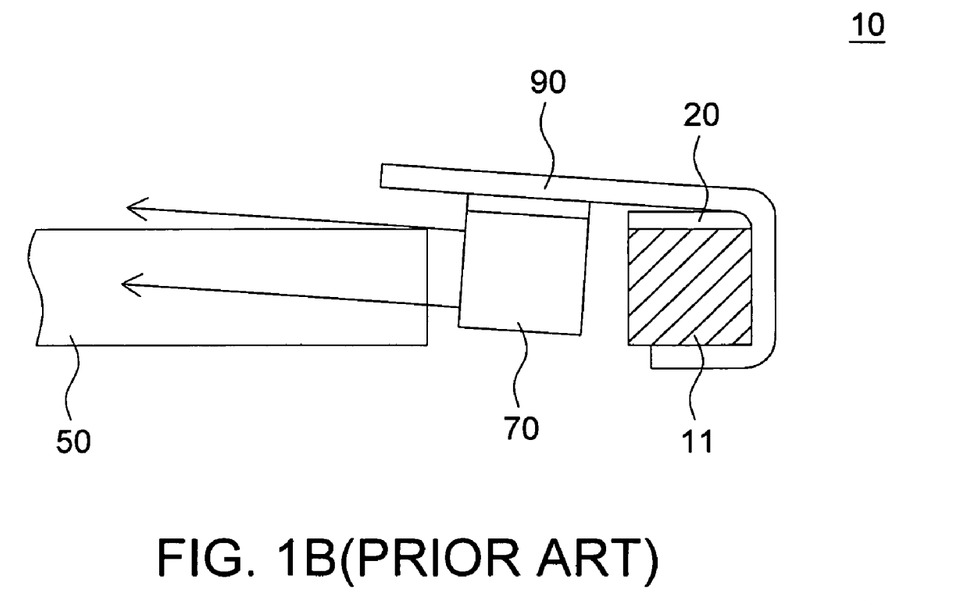
FIG. 1B (Prior Art) shows the flexible printed circuit board in FIG. 1A rising up due to the bounceback.

As the flexible printed circuit board 90 is bent to be disposed on the frame 11, the flexible printed circuit board 90 has bounceback stresses. Referring to FIG. 1B, the flexible printed circuit board in FIG. 1A rising up due to the bounceback is shown. After the flexible printed circuit board 90 rises up, the position of the LED 70 changes accordingly. Thus, a part of light emitted by the LED 70 can not radiate into the light guide plate 50, so that the light emitting efficiency of the backlight module 10 is reduced. Even the light uniformity of the backlight module 10 is reduced when the optical path of the light emitted by the LED 70 deflects.

A common method to resolve the above problem is to make the flexible printed circuit board 90 more firmly adhered on the frame 11 by the glue 20 with high adhesiveness. However, the smeared area for the glue 20 is limited and the use of the glue 20 with higher adhesiveness always further increases the cost. Another common method is to add a fixing member to avoid the bounceback of the flexible printed circuit board 90. For example, a frame (not illustrated) is added outside the flexible printed circuit board 90 to fix the flexible printed circuit board 90. Or, a clip (not illustrated) is temporarily used to clamp and fix the flexible printed circuit board 90 on the frame 11. However, adding an additional fixing member will increase both manufacturing cost and time. Furthermore, if the fixing member (the frame) is disposed outside the flexible printed circuit board 90, the overall thickness of the backlight module 10 increases as well. Therefore, how to reduce the occurrence of the bounceback of the bent flexible printed circuit board so as to avoid the light emitting efficiency and uniformity of the backlight module being affected caused by the deflection of the light source has become an imminent issue to be resolved.

SUMMARY OF THE INVENTION

The invention is directed to a backlight module which makes the occurrence of the bounceback of a bent flexible printed circuit board reduced. In addition, the possibility that the light emitting efficiency of the backlight module is reduced due to the bounceback of the flexible printed circuit board can be reduced, so that the backlight module has excellent light emitting efficiency and uniformity.

According to the present invention, a backlight module including a frame, a light guide plate, a light source and a flexible printed circuit board is provided. The light guide plate is disposed in the frame. The flexible printed circuit board disposed on the frame and the light guide plate includes a body, a light source carrying portion and a connecting portion. A part of the body is bent, such that a top edge and a bottom edge of the body are respectively disposed on a top side and a bottom side of the frame. The light light source carrying portion is located at a side of the body and carries the light source. The connecting portion has a first end and a second end. The first end is connected to a middle region of a bottom side of the light source carrying portion. The second end is connected to the bottom edge of the body. The connecting portion is bent, such that the light source carrying portion is disposed on the top side of the frame and the light source is positioned at a side of the light guide plate.

The invention will become apparent from the following detailed description of the preferred but non-limiting embodiments. The following description is made with reference to the accompanying drawings.

DETAILED DESCRIPTION OF THE INVENTION

Figure 2:
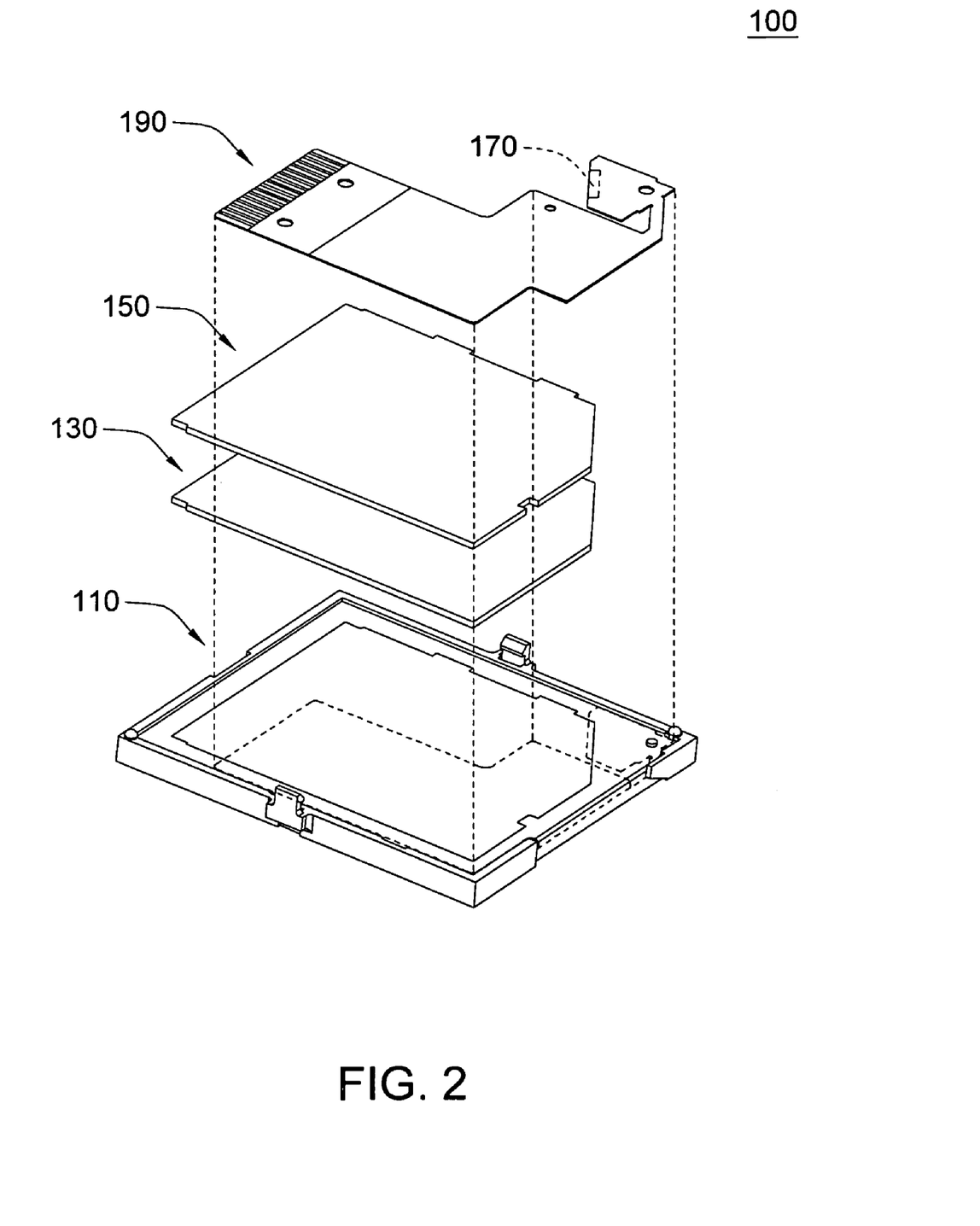
FIG. 2 shows an exploded diagram of a backlight module according to a preferred embodiment of the invention.

Referring to FIG. 2, an exploded diagram of a backlight module according to a preferred embodiment of the invention is shown. The backlight module 100 includes a frame 110, a light guide plate 150, a light source 170 and a flexible printed circuit board 190. The light guide plate 150 is disposed in the frame 110. The flexible printed circuit board 190 is disposed on the frame 110 and the light guide plate 150.

Figure 3A:
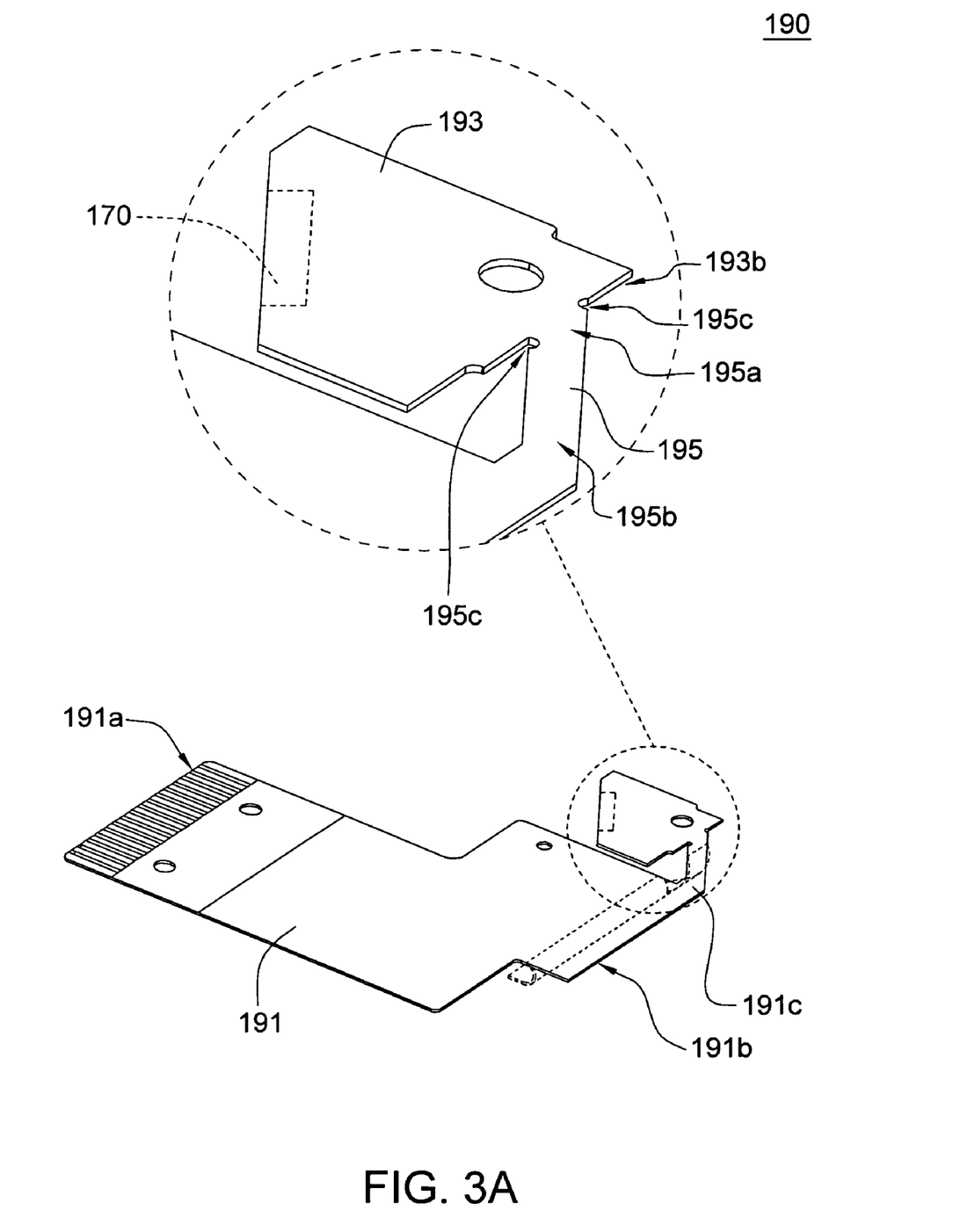
FIG. 3A shows the flexible printed circuit board in FIG. 2.
Figure 3B:
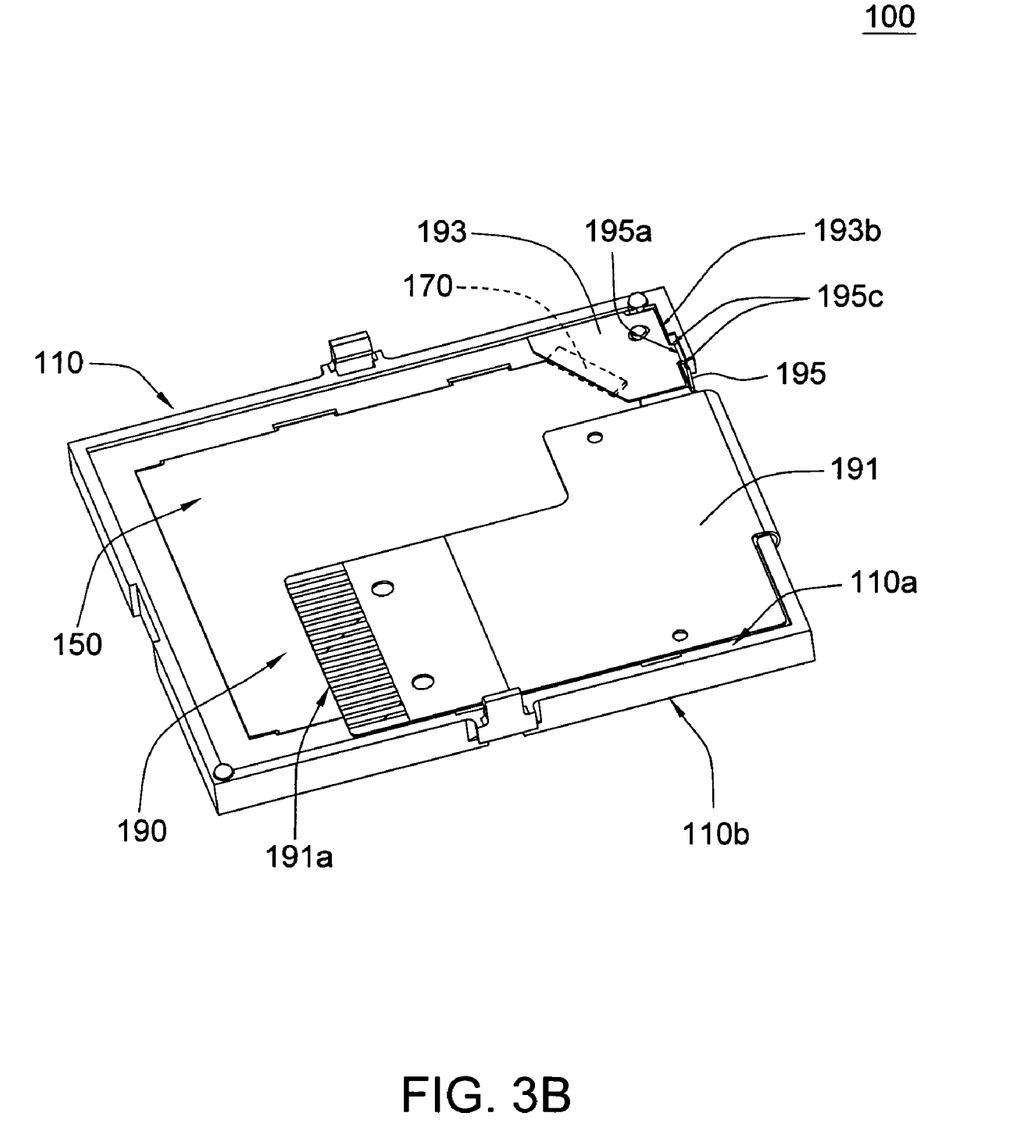
FIG. 3B shows the flexible printed circuit board in FIG. 3A disposed on the frame.

Referring to both FIG. 3A and FIG. 3B, the flexible printed circuit board in FIG. 2 is shown in FIG. 3A, and the flexible printed circuit board in FIG. 3A disposed on the frame is shown in FIG. 3B. The flexible printed circuit board 190 includes a body 191, a light source carrying portion 193 and a connecting portion 195. A part of the body 191 is bent, such that a top edge 191a and a bottom edge 191b of the body 191 are respectively disposed on a top side 110a and a bottom side 110b of the frame 110. The light source carrying portion 193 positioned at a side of the body 191 carries the light source 170 disposed underneath (illustrated in dotted lines in FIG. 3B). The light source 170 is, for example, a light emitting diode (LED). The connecting portion 195 has a first end 195a and a second end 195b. The first end 195a is connected to a middle region of a bottom side 193b of the light source carrying portion 193. The second end 195b is connected to the bottom edge 191b of the body 191. The connecting portion 195 is bent, such that the light source carrying portion 193 is disposed on the top side 110a of the frame 110 and that the light source 170 is positioned at a side of the light guide plate 150 (as indicated in FIG. 3B).

When the light source 170 emits light, the light radiates into the light guide plate 150. The structure of the light guide plate 150 guides the direction of the light. Thus, the display panel with the backlight module 100 can use the light to display a frame.

The backlight module 100 of the present embodiment of the invention is further elaborated below. As indicated in FIG. 2, the backlight module 100 further includes at least one optical film 130 disposed in the frame 110, and the optical film 130 is, for example, a diffusion film. The light guide plate 150 is disposed on the optical film 130 for guiding the light to proceed towards the optical film 130. The light is uniformed when passing through the optical film 130 such that the display panel can use the light to display a frame.

As indicated in FIG. 3A, the connecting portion 195 of the flexible printed circuit board 190 has two notches 195c adjacent to the first end 195a and located at two opposite sides of the connecting portion 195. Preferably, the notches 195c are located at the first end 195a, and the outline of each notch 195c is an arc. Thus, when the connecting portion 195 is bent, the rebounding force applied to the light source carrying portion 193 by the connecting portion 195 can be effectively reduced so to avoid the light source carrying portion 193 rising up and coming off the frame 110. Moreover, the stresses gathering at the first end 195a of the connecting portion 195 to cause the connecting portion 195 to break can be avoided.

Figure 4:
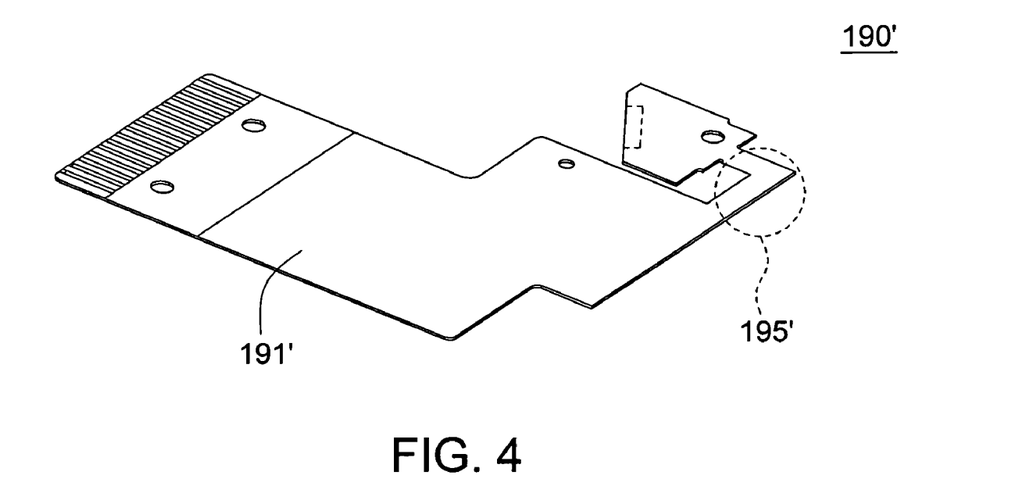
FIG. 4 shows a flexible printed circuit board with another shape.

Besides, the connecting portion 195 is, for example, bar-shaped and slantwise extends to connect a body extending portion 191c of the body 191 to the light source carrying portion 193. The body extending portion 191c transversely extends from the bottom edge 191b of the body 191. The shapes of the body 191 and the connecting portion 195 of the flexible printed circuit board 190 are not limited to those illustrated in FIG. 3A. Referring to FIG. 4, a flexible printed circuit board with another shape is shown. The shape of a connecting portion 195' of a flexible printed circuit board 190' is an L shape. However, a body 191' of the flexible printed circuit board 190' does not have the body extending portion 191c illustrated in FIG. 3A.

Figure 5:
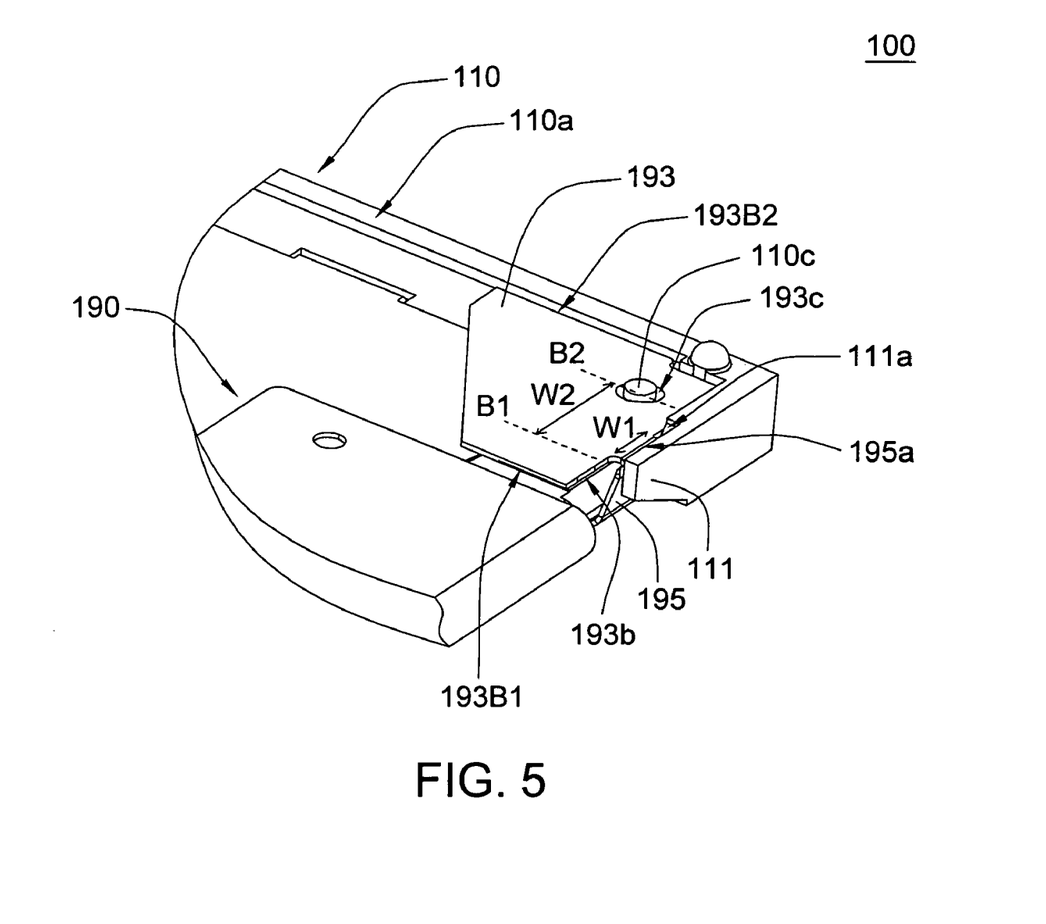
FIG. 5 shows a partial enlarged illustration of the backlight module in FIG. 3B.

As indicated in FIG. 3B, the light source carrying portion 193 is, for example, disposed at a corner of the frame 110 and is glued on the frame 110. Referring to FIG. 5, a partial enlarged illustration of the backlight module in FIG. 3B is shown. According to the above disclosure, the first end 195a of the connecting portion 195 is connected to the middle region of the bottom side 193b of the light source carrying portion 193. The range of the middle region is defined by two boundaries B1 and B2. Preferably, when the width of the first end 195a of the connecting portion 195 is W1, the distance between the boundary B1 and a side 193B1 of the light source carrying portion 193 is substantially 1.2 times the width W1, and the distance between the other boundary B2 of the middle region and the side 193B1 of the light source carrying portion 193 is substantially 4.2 times the width W1. That is, the width W2 of the middle region is 3 times the width W1 of the first end 195a of the connecting portion 195. Thus, when the connecting portion 195 is bent, the light source carrying portion 193 is less likely to rebound. According to the analysis of samples, if the position at which the connecting portion 195 is connected to the light source carrying portion 193 is outside the middle region, the light source carrying portion 193 is more likely to detach detach from the glue disposed underneath and then rise up to come off the frame 110. To the contrary, if the position at which the connecting portion 195 is connected to the light source carrying portion 193 is within the middle region, the light source carrying portion 193 is less likely to detach from the glue disposed underneath. Therefore, by connecting the first end 195a of the connecting portion 195 to the range within the middle region, the connecting portion 195 is less likely to make the light source carrying portion 193 raised up.

The range of the middle region can be also defined as follows. The distance between the boundary B2 of the middle region and a side 193B2 of the light source carrying portion 193 is substantially 1.2 times the width W1 of the first end 195a, and the distance between the other boundary B1 of the middle region and the side 193B2 of the light source carrying portion 193 is substantially 4.2 times the width W1 of the first end 195a.

Also, as indicated in FIG. 5, the light source carrying portion 193 has a hole 193c, and the frame 110 of the backlight module 100 has a protrusion 110c. The hole 193c is for the protrusion 110c to pass through when the flexible printed circuit board 190 is disposed on the frame 110. As a result, not only the light source carrying portion 193 is positioned on the frame 110 but the occurrence that the light source carrying portion 193 rises up can be further avoided. Moreover, the protrusion 110c can be fixed on the light source carrying portion 193 by way of thermal melting to avoid the light source carrying portion 193 rebounding due to the bend.

Figure 6A:
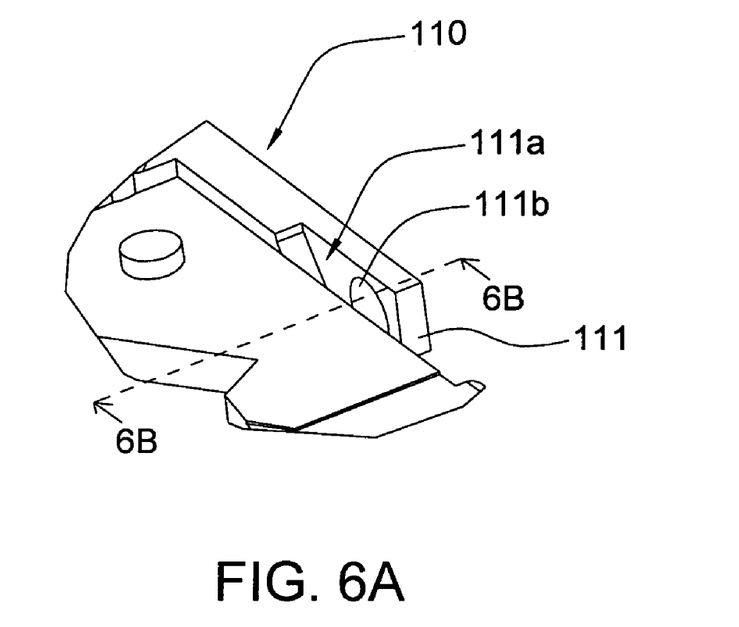
FIG. 6A shows a partial diagram of the frame in FIG. 5.
Figure 6B:
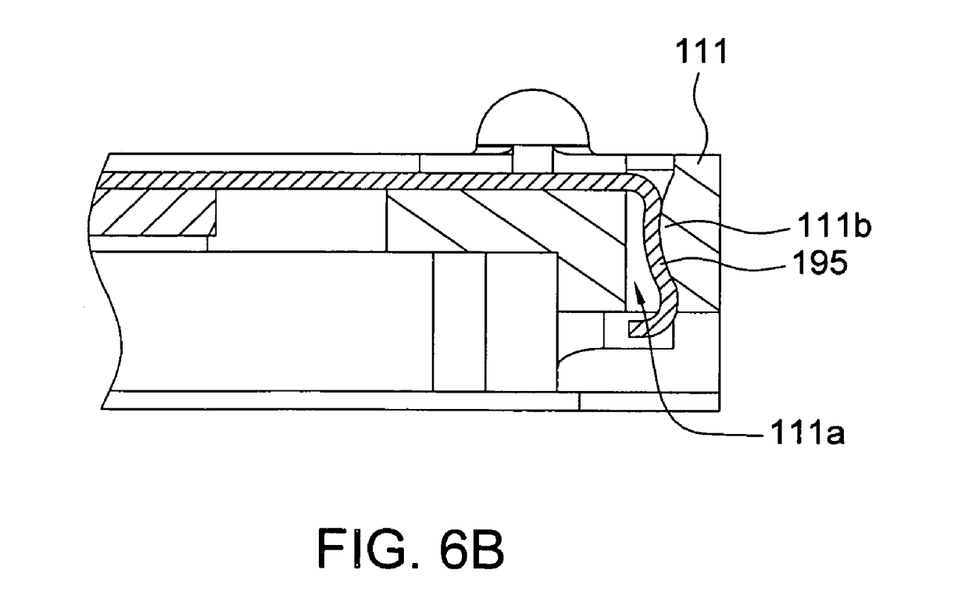
FIG. 6B shows a cross-sectional view of the flexible printed circuit board along a cross-sectional line 6B-6B when the flexible printed circuit board is disposed on the frame in FIG. 6A.

Referring to FIG. 6A, a partial diagram of the frame in FIG. 5 is shown. The frame 110 has an extending structure 111. The extending structure 111 extends from a corner of the frame 110 to form a space 111a between the frame 110 and the extending structure 111. Besides, the extending structure 111 has a protrudent structure 111b positioned on an inner wall of the extending structure 111 and protruding towards the frame 110. As indicated in FIG. 5, the bent connecting portion 195 is received in the space 111a. Referring to FIG. 6B, a cross-sectional view of the flexible printed circuit board along a cross-sectional line 6B-6B when the flexible printed circuit board is disposed on the frame in FIG. 6A is shown. The protrudent structure 111b presses the connecting portion 195. With the disposition of the extending structure 111 and its protrudent structure 111b, the connecting portion 195 of the flexible printed circuit board 190 (as indicated in FIG. 5) is pressed in advance, such that the possibility that the light source carrying portion 193 (as indicated in FIG. 5) rebounds caused by the stresses applied from the bent connecting portion 195 can be reduced.

Figure 7:
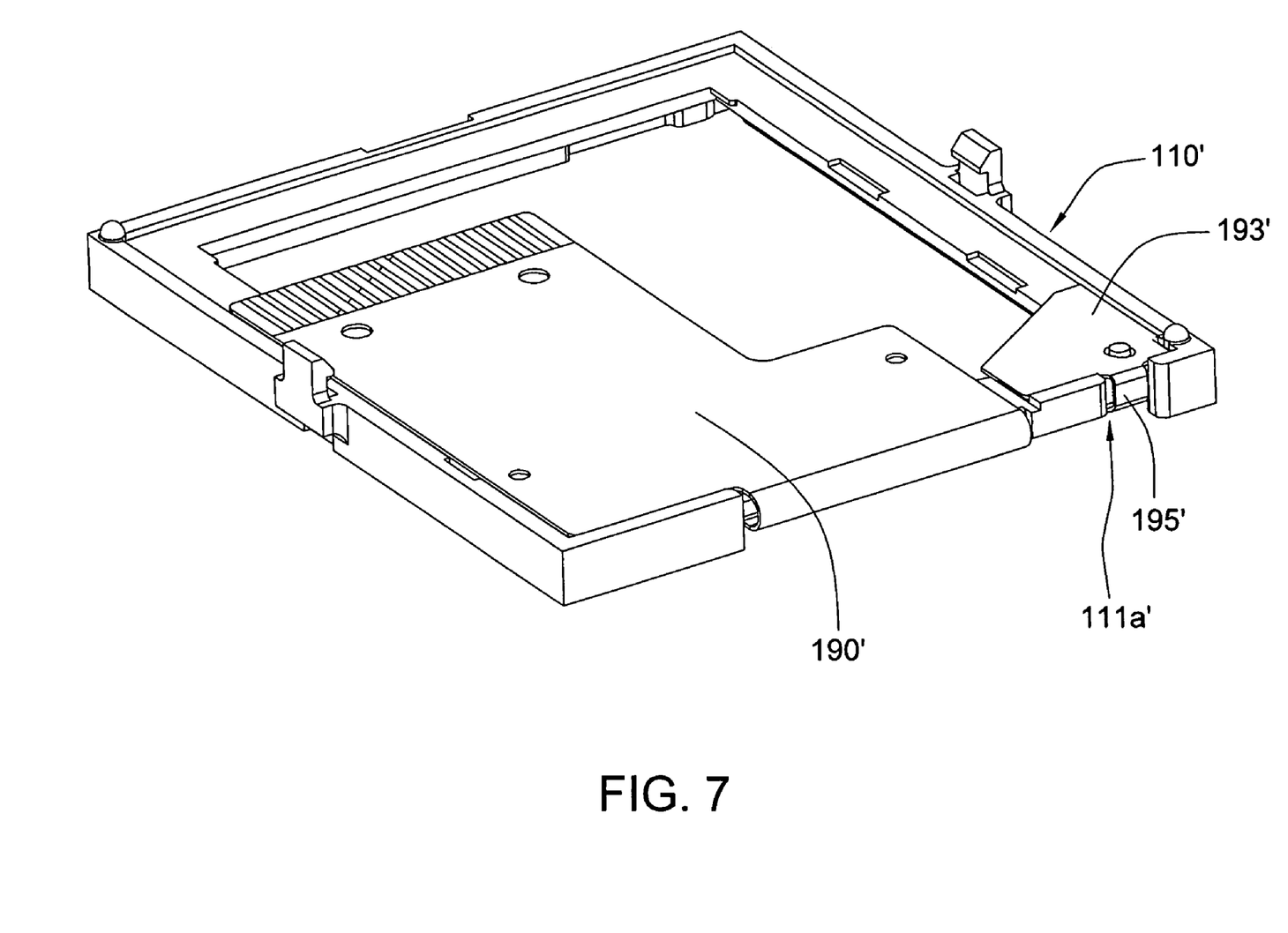
FIG. 7 shows the frame for receiving the flexible printed circuit board in FIG. 4.

The frame 110 in FIG. 6A is merely an example of practical application. Anyone who is skilled in the related art will understand that the design of the frame 110 can be adjusted or modified to fit the actual requirement. Referring to FIG. 7, the frame for receiving the flexible printed circuit board in FIG. 4 is shown. The shape of the connecting portion 195' of the flexible printed circuit board 190' in FIG. 4 is an L shape. Therefore, as indicated in FIG. 7, the frame 110' has a recess 111a' for reciting the bent connecting portion 195'.

According to the backlight module disclosed in the above embodiment of the invention, the connecting portion of the flexible printed circuit board is connected to the middle region of the bottom side of the light source carrying portion. Therefore, the possibility that the light source carrying portion rebounces to rise up due to the bent the flexible printed circuit board can be reduced, such that the backlight module has excellent light emitting efficiency and uniformity and the display panel can display high quality images. Compared with the conventional methods, the backlight module of the provided embodiment can further used for effectively reducing the manufacturing cost and time.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
    a frame;
    a light guide plate disposed in the frame;
    a light source; and
    a flexible printed circuit board disposed on the frame and the light guide plate, wherein the flexible printed circuit board comprises:
        a body, wherein a part of the body is bent, such that a top edge and a bottom edge of the body are respectively disposed on a top side and a bottom side of the frame;
        a light source carrying portion located at a side of the body and carrying the light source; and
        a connecting portion having a first end and a second end, wherein the first end is connected to a middle region of a bottom side of the light source carrying portion, the second end is connected to the bottom edge of the body, and the connecting portion is bent, such that the light source carrying portion is disposed on the top side of the frame and the light source is positioned at a side of the light guide plate;
    wherein the middle region is identified by two boundary such that the distance between one boundary of the middle region and a side of the light source carrying portion is substantially 1.2 times the width of the first end, and the distance between the other boundary of the middle region and the side of the light source carrying portion is substantially 4.2 times the width of the first end.

2. The backlight module according to claim 1, wherein the connecting portion has two notches adjacent to the first end and located at two opposite sides of the connecting portion.

3. The backlight module according to claim 2, wherein the outline of each notch is an arc.

4. The backlight module according to claim 1, wherein the connecting portion has two notches located at the first end and at two opposite sides of the connecting portion.

5. The backlight module according to claim 1, wherein the shape of the connecting portion is substantially an L shape.

6. The backlight module according to claim 1, wherein the connecting portion is bar-shaped and slantwise extends to connect the body to the light source carrying portion.

7. The backlight module according to claim 1, wherein the body has a body extending portion transversely extending from the bottom edge of the body, and the second end of the connecting portion is connected to the body extending portion.

8. The backlight module according to claim 1, wherein the light source carrying portion is disposed at a corner of the frame by glue.

9. The backlight module according to claim 1, wherein the frame has a protrusion, and the light source carrying portion has a hole for the protrusion to pass through when the flexible printed circuit board is disposed on the frame.

10. The backlight module according to claim 1, wherein the frame has an extending structure extending from a corner of the frame to form a space between the frame and the extending structure, and the bent connecting portion is received in the space.

11. The backlight module according to claim 10, wherein the extending structure has a protrudent structure positioned on an inner wall of the extending structure and protruding towards the frame for pressing the connecting portion.

12. The backlight module according to claim 1, wherein the frame has a recess for receiving the bent connecting portion.

13. The backlight module according to claim 1, further comprises:
    at least one optical film disposed in the frame, wherein the light guide plate is disposed on the optical film.

* * * * *

UNITED STATES PATENT AND TRADEMARK OFFICE
CERTIFICATE OF CORRECTION

| | | |
|---|---|---|
| PATENT NO. | : 8,016,476 B2 | Page 1 of 1 |
| APPLICATION NO. | : 12/465951 | |
| DATED | : September 13, 2011 | |
| INVENTOR(S) | : Chen et al. | |

It is certified that error appears in the above-identified patent and that said Letters Patent is hereby corrected as shown below:

Cover Page: The Assignee should be "Wintek Corporation"

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

PATENT NO. : 8,016,476 B2  Page 1 of 1
APPLICATION NO. : 12/465951
DATED : September 13, 2011
INVENTOR(S) : Chen et al.

It is certified that error appears in the above-identified patent and that said Letters Patent is hereby corrected as shown below:

Title Page, Item (73) should read
"Wintek Corporation"

Signed and Sealed this
Nineteenth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,016,476 B2 | Page 1 of 1 |
| APPLICATION NO. | : 12/465951 | |
| DATED | : September 13, 2011 | |
| INVENTOR(S) | : Ming-Da Chen et al. | |

It is certified that error appears in the above-identified patent and that said Letters Patent is hereby corrected as shown below:

This certificate supersedes the Certificate of Correction issued November 29, 2011. The certificate is vacated since petition to correct assignee under 3.81(b) was not granted by the office of petitions at time of issuance. The Certificate of Correction should not have been issued for this patent.

Signed and Sealed this
Third Day of July, 2012

David J. Kappos
*Director of the United States Patent and Trademark Office*